(12) United States Patent
Francik et al.

(10) Patent No.: US 6,429,245 B1
(45) Date of Patent: *Aug. 6, 2002

(54) TIRE TREAD WITH ELASTOMERS OF SPATIALLY DEFINED TG'S

(75) Inventors: William Paul Francik, Bath; Edward John Blok, Wadsworth; Paul Harry Sandstrom, Tallmadge; John Joseph Andre Verthe, Kent; David John Zanzig, Uniontown; Adel Farhan Halasa, Bath, all of OH (US)

(73) Assignee: The Goodyear Tire & Rubber Company, Akron, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/931,169

(22) Filed: Sep. 16, 1997

(51) Int. Cl.[7] .................................................. C08K 5/24
(52) U.S. Cl. ........................ 524/262; 524/526; 152/450
(58) Field of Search ................................. 524/262, 526; 152/450

(56) References Cited

U.S. PATENT DOCUMENTS

| 4,485,205 A | 11/1984 | Fujimiaki et al. ............ 524/526 |
| 4,721,749 A | 1/1988 | Odar et al. .................... 52/526 |

FOREIGN PATENT DOCUMENTS

| EP | 313164 A2 | 4/1989 | ............. B60C/1/00 |
| GB | 1289870 A | 9/1972 | ............. C08D/9/00 |

OTHER PUBLICATIONS

Copy of the European Search Report.

*Primary Examiner*—Peter D. Mulcahy
(74) *Attorney, Agent, or Firm*—Henry C. Young, Jr.

(57) ABSTRACT

The invention relates to a tire with a tread. The tread is composed of at least two defined elastomers having Tg's spaced apart by at least 55° C. to the exclusion of elastomers having Tg's between −30° and −85° C. The tread composition can be reinforced with either carbon black or a combination of carbon black and silica reinforcing fillers.

11 Claims, No Drawings

TIRE TREAD WITH ELASTOMERS OF SPATIALLY DEFINED TG'S

FIELD

This invention relates to a tire having a rubber tread which is composed of at least two defined elastomers with spaced-apart Tg's. The tread rubber may be reinforced with either carbon black or a combination of silica and carbon black reinforcing fillers, together with a coupling agent for the silica.

BACKGROUND

Pneumatic rubber tires are conventionally prepared with a rubber tread which can be a blend of various rubbers which is typically reinforced with carbon black.

In one aspect, rubbers are evaluated, selected and blended for a purpose of achieving desired tire tread properties and particularly a balance of tire tread characteristic properties, mainly, traction, rolling resistance, and wear.

Typically, the tread rubber is reinforced with carbon black or a combination of carbon black and silica fillers. Often, the silica is used with a silica coupler to couple the silica to the elastomers for rubber reinforcement purposes. Such use of carbon black and silica, including use of silica couplers, is well known to those having skill in such art.

Historically, it is recognized that tires have heretofore been suggested and/or have been prepared with treads of rubber compositions which are based on (i) blends of elastomers having similar Tg's or (ii) blends of elastomers with widely spaced apart Tg's by at least 30° C.

For example, tires with treads composed of a blend of elastomers with glass transition temperatures (Tg's) differing by at least 30° C. might be prepared with styrene/butadiene copolymer rubbers having a Tg in a range of about −35° C. to about −50° C. blended with natural rubber having a Tg of about −60 to about −65° C. and/or cis 1,4-polybutadiene rubber having a Tg of about −85 to about −105° C. to obtain tire tread compositions with acceptable traction on wet road surfaces and on sometimes icy road surfaces.

Also, a tire with tread composed of emulsion polymerization prepared styrene/butadiene copolymer rubber with a Tg in a range of about −35 to about −50° C. with natural cis 1,4-polyisoprene rubber having a Tg of about −65° C. might be used for winter performance, such as traction on icy road surfaces and/or might reduce the tread's traction on a wet road surface.

Here, it is desired to provide a tire tread composed of elastomers with substantially spaced apart and defined Tg's, to the exclusion of elastomers of specified intermediate Tg's, to enhance traction and/or treadwear.

In the description of this invention, the term "phr" as used herein, and according to conventional practice, refers to "parts of a respective material per 100 parts by weight of rubber".

The terms such as "compounded rubber", "rubber compound" and "rubber composition" relate generally to "rubber which has been mixed with various rubber compounding ingredients". Such terms are well known to those skilled in the rubber mixing art, especially for tires.

The terms "vulcanized", "vulcanize", "cured" and "cure", if used herein, are used interchangeably to refer to the "vulcanization of rubber" and such terms are well known to those having a skill in the rubber vulcanization art.

The term "Tg", as used herein, refers to the "glass transition temperature of a particular elastomer". Glass transition temperatures are well known characterizations of elastomers. They may, for example, be suitably determined by a DSC instrument with a heating rate of 20° C. per minute.

SUMMARY AND PRACTICE OF THE INVENTION

In accordance with this invention, a pneumatic tire is provided having a tread of a rubber composition comprised of, based on 100 parts by weight rubber, and exclusive of elastomers having a Tg between −30° C. and −85° C.;

(A) about 20 to about 50, alternatively about 30 to about 40, phr of at least one synthetic elastomer having a Tg in a range of −30° C. to about +10° C. selected from high vinyl polybutadiene with a vinyl 1,2-content in a range of about 75 to about 95 percent; isoprene/butadiene copolymer containing about 10 to about 90 percent units derived from isoprene; 3,4-polyisoprene having a 3,4-microstructure content of at least 60 percent; emulsion polymerization prepared styrene/butadiene copolymer having from about 45 to about 65 percent units derived from styrene and a vinyl 1,2-content based on the butadiene component thereof in a range of about 8 to about 15 percent; and solution polymerization prepared styrene/butadiene copolymer having from about 15 to about 40 percent units derived from styrene and a vinyl 1,2-content based on the butadiene component thereof in a range of about 15 to about 60 percent; and (B) about 50 to about 80, alternatively about 60 to about 70 phr of at least one synthetic elastomer having a Tg in a range of −85° C. to about −110° selected from isoprene/butadiene copolymer having about 10 to about 30 percent units derived from isoprene; cis 1,4-polybutadiene rubber having about 90 to about 98 percent cis 1,4-microstructure, and a vinyl 1,2-content in a range of about 2 to about 10 percent with the remainder being primarily of a trans 1,4-microstructure;

(C) about 40 to about 100, alternatively about 60 to about 90, phr of particulate reinforcing filler selected from (1) carbon black or (2) carbon black and silica, preferably precipitated silica, with a weight ratio of carbon black to silica in a range of about 1/20 to about 20/1, alternatively about 1/5 to about 5/1;

(D) at least one silica coupler for the silica, if silica is used, having a moiety reactive with the surface of said silica and another, sulfur based, moiety interactive with said elastomer.

Typically, the silica coupler has a silane moiety reactive with the surface of the silica such as, for example, silanol groups thereon, and another, polysulfide based, moiety interactive with the elastomers, typically in a weight ratio of silica to coupler of about 7/1 to about 15/1. For example, the coupler may be a bis-(trialkoxysilylalkyl)polysulfide having from 2 to about 8 sulfur atoms in its polysulfidic bridge. Exemplary of such a coupler may be a bis-(3-triethoxysilylpropyl)polysulfide having an average of about 2 to about 5 sulfur atoms in its polysulfidic bridge.

Significantly, the tread rubber composition is required to contain an appreciable content of elastomer(s) having a relatively high Tg in a range of −30 to about +10° C. A purpose of utilizing such high Tg elastomers is to enhance traction, particularly wet traction.

Also, significantly, the tread rubber composition is required to contain an appreciable content of elastomer(s)

having a relatively low Tg in a range of about −85 to about −110° C. A purpose of utilizing such low Tg elastomer(s) is to reduce treadwear.

It is further significant, for the purposes of this invention, that elastomers having a Tg within a range of −35 to −85° C. are intended to be excluded. This is because such elastomers are considered herein as not being suitable, or entirely significant contributors to traction and/or, as the case may be, reduced treadwear. Representative examples of such elastomers desired to be excluded are those such as, for example, cis 1,4-polyisoprene whether natural or synthetic, and emulsion polymerization prepared styrene/butadiene elastomers (SBR's) containing less than 45 percent units derived from styrene.

While the mechanism may not be completely understood, it is believed that it is the prescribed combination of high and low spatially defined Tg elastomers which acts to promote the aforesaid more optimized traction and treadwear aspects of the tire tread rubber composition.

The various polybutadiene rubbers for use in this invention can be prepared by organic solution polymerization processes for 1,3-butadiene monomer well known to those having skill in such art.

The organic solution polymerization prepared isoprene/butadiene copolymer elastomer can be suitably prepared by copolymerization of isoprene and 1,3-butadiene in an organic solvent solution in the presence of a suitable catalyst and modifier. A preparation of such isoprene/butadiene copolymer elastomer is well known to those having a skill in such art.

It is understood herein that it is well known to those having skill in the tire tread art to use various blends of elastomers for tire tread compositions. However, it is an important feature of this invention that specific elastomers are used in specified amounts as a basic rubber composition in a substantial absence of other elastomers together with carbon black reinforcing filler or with reinforcing filler composed of both carbon black and silica. It is believed herein that such specified combination of elastomers for use in rubber tire treads is novel and inventive.

It is contemplated herein that the wet performance (traction, or braking) and rolling resistance of the tire could be further improved by replacing part of the carbon black reinforcement with silica plus a silica coupler, as hereinbefore discussed.

In the practice of this invention, the basic, balanced, tread rubber composition as a blend of spatially defined high and low Tg elastomers is provided which relies upon carbon black or upon a combination of carbon black and silica, together with a silica coupler, for rubber reinforcement. The silica, in turn, relies upon use of a silica coupler for the silica's reinforcing effect for the rubber blend.

It is recognized that various elastomer reinforcing carbon blacks can be used in the practice of this invention for the tire tread rubber composition as would be well known to those skilled in such art. For example, relatively high reinforcing carbon blacks are contemplated such as those having an iodine number in a range of about 80 to about 150 and a DBP (dibutylphthalate) value in a range of about 90 to about 150 as exemplified in *The Vanderbilt Rubber Handbook* (1990), page 417). For example, the N121, N220, N234, N330 and N375 carbon blacks might be contemplated.

The commonly employed siliceous pigments used in rubber compounding applications can be used as the silica in this invention, including pyrogenic and precipitated siliceous pigments (silica), although precipitated silicas are preferred.

The siliceous pigments preferably employed in this invention are precipitated silicas such as, for example, those obtained by the acidification of a soluble silicate, e.g., sodium silicate.

The BET surface area of the silica, as measured using nitrogen gas, may be in a range of about 100 to about 250, preferably about 120 to about 200, square meters per gram ($m^2/g$). The BET method of measuring surface area is described in the *Journal of the American Chemical Society*, Volume 60, page 304 (1930).

The silica also may typically have a dibutylphthalate (DBP) absorption value in a range of about 100 to about 400, and usually about 150 to about 300 ml/100 g.

Various commercially available silicas may be considered for use in this invention such as, for example only and without limitation, silicas commercially available from PPG Industries under the Hi-Sil trademark with designations 210, 243, etc; silicas available from Rhone-Poulenc, with designation of Zeosil 1165MP, silicas available from Degussa AG with designations VN2 and VN3, and BV3370GR and from J. M. Huber as, for example, Zeopol 8745.

It is readily understood by those having skill in the art that the rubber composition of the tread rubber would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typically additions of carbon black, for this invention are hereinbefore set forth. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), pages 344–346. Typical amounts of antiozonants comprise about 1 to about 5 phr. Typical amounts of fatty acids, if used, which can include stearic acid comprise about 0.5 to about 5 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, with a range of from about 0.5 to about 2.5 being sometimes preferred.

Accelerators are used to control the time and/or temperature required for vulcanization and to improve the properties of the vulcanizate. Retarders are also used to control the rate of vulcanization. In one embodiment, a single accelerator system may be used, i.e., primary accelerator. Conventionally and preferably, a primary accelerator(s) is used in total amounts ranging from about 0.5 to about 4, alternatively about 1.2 to about 2.0, phr. In another embodiment, combinations of a primary and secondary accelerator might be used, with the secondary accelerator being used in amounts of about 0.05 to about 3 phr, for example, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The presence and relative amounts of the above additives are not considered to be an aspect of the present invention which is more primarily directed to the use of the specified blend of synthetic elastomers with spatially defined relatively high Tg's and relatively low Tg's, all with an exclusion of elastomers with specified intermediate defined Tg's.

The tire can be built, shaped, molded and cured by various methods which will be readily apparent to those having skill in such art.

The invention may be better understood by reference to the following examples in which the parts and percentages are by weight unless otherwise indicated.

EXAMPLE I

Rubber compositions (compounded rubber) are prepared as blends of elastomers of spatially defined high and low Tg's, referred to herein as Exp B–D, as well as a Control rubber composition containing natural rubber (cis 1,4-polyisoprene) identified herein as Control-A.

The rubber compositions are prepared by mixing the ingredients in several stages, namely, 2 sequential internal mixing stages without the curatives (usually referred to as "non-productive mix stages") and a final internal mixing stage for adding the curatives (usually referred to as a "productive mix stage"). Then the resulting composition is molded and cured under conditions of elevated temperature and pressure.

Such mixing of rubber compositions is well known to those having skill in such art.

The rubber compositions are comprised of the ingredients illustrated in Table 1. The amounts of materials are presented in terms of phr, or parts by weight of material per 100 parts by weight of dry rubber.

TABLE 1

|  | Control A | Exp B | Exp C | Exp D |
|---|---|---|---|---|
| First Non-Productive Mix | | | | |
| S-SBR[1] | 50 | 0 | 0 | 0 |
| Natural Rubber[2] | 50 | 0 | 0 | 0 |
| Cis-BR[3] | 0 | 70 | 80 | 80 |

TABLE 1-continued

|  | Control A | Exp B | Exp C | Exp D |
|---|---|---|---|---|
| HV-BR[4] | 0 | 30 | 0 | 10 |
| 3,4-PI[5] | 0 | 0 | 20 | 10 |
| Processing Aids[6] | 7.7 | 7.7 | 7.7 | 7.7 |
| Zinc Oxide | 3.5 | 3.5 | 3.5 | 3.5 |
| Antidegradants[7] | 3.4 | 3.4 | 3.4 | 3.4 |
| Carbon Black | 43 | 43 | 43 | 43 |
| Second Non-Productive Mix | | | | |
| Silica[8] | 17 | 17 | 17 | 17 |
| Rubber Processing Oil | 3 | 3 | 3 | 3 |
| Coupling Agent[9] | 3.5 | 3.5 | 3.5 | 3.5 |
| Sulfur & Accelerators[10] | | | | |

[1]Solution polymerization prepared styrene/butadiene copolymer elastomer as SLF1216 from The Goodyear Tire & Rubber Company containing about 12 percent styrene, having a Tg of about −40° C. and a Mooney Viscosity (ML/4) at 100° C. of about 85.
[2]Natural cis 1,4-polyisoprene rubber.
[3]Cis 1,4-polybutadiene rubber as BUDENE ® 1208 from The Goodyear Tire & Rubber Company having a Tg of about −103° C.
[4]High vinyl polybutadiene from The Goodyear Tire & Rubber Company having a vinyl content of about 80 percent and a Tg of about −25° C. and a Mooney viscosity (ML/4) at 100° C. of about 82.
[5]3,4-polyisoprene rubber obtained from The Goodyear Tire & Rubber Company having a 3,4-content of about 60–70 percent, a Tg of about −16° C. and a Mooney viscosity (ML/4) at 100° C. of about 70.
[6]The processing aids were composed of rubber processing aids were composed of rubber processing oil, fatty acid (primarily stearic acid) and microcrystalline waxes.
[7]Antidegradants of the amine type.
[8]Silica as Hi-Sil-210 from the PPG company.
[9]Silica coupler obtained as X50S from the Degussa company as a 50/50 blend of carbon black and bis (triethoxysilylpropyl) polysulfide having an average of about 3.5 to about 4 sulfur atoms in the polysulfidic bridge.
[10]Accelerator(s) of the sulfenamide type.

TABLE 2

| Property | Control A | Exp B | Exp C | Exp D |
|---|---|---|---|---|
| Rheometer Measurements (150° C.) | | | | |
| Max Torque (dNm) | 35 | 38 | 38 | 39 |
| Min Torque (dNm) | 8 | 10.5 | 11 | 10.8 |
| Delta Torque | 27 | 27.5 | 27 | 28.2 |
| T$_{90}$ (min) | 16.5 | 19.5 | 13.5 | 16.5 |
| Stress-Strain Measurements | | | | |
| Tensile (MPa) | 19.9 | 14.2 | 15.1 | 14.3 |
| Elongation (%) | 549 | 499 | 529 | 522 |
| 100% Modulus (MPa) | 2.2 | 2.1 | 2.2 | 2.0 |
| 300% Modulus (MPa) | 10.0 | 8.2 | 8.3 | 7.8 |
| Rebound Measurements | | | | |
| 23° C. (%) | 43 | 49 | 44 | 47 |
| 100° C. (%) | 60 | 60 | 60 | 60 |
| Hardness, Shore A | | | | |
| 23° C. | 63 | 63 | 65 | 64 |
| 100° C. | 57 | 58 | 59 | 59 |
| DIN Abrasion | 127 | 59 | 44 | 46 |
| Tan. Delta @ 0° C. | 0.121 | 0.128 | 0.201 | 0.145 |

The results reported in Table 2 illustrate the advantage of utilizing the spatially defined high and low Tg elastomers in a tire tread rubber composition insofar as rolling resistance, traction and abrasion resistance are concerned.

In particular, the Control A rubber composition is illustrated as which might be called an example or conventional wisdom for a tire tread rubber composition, although it is acknowledged that many other tire tread rubber compositions have been suggested and used.

Samples Exps B–D illustrate rubber compositions of this invention which are composed of elastomers of spatially defined high and low Tg rubbers.

The most dramatic demonstrative effect is the DIN abrasion values in which lower values represent lower wear due to abrasion for the abrasion test.

Another significant aspect of the comparative properties is the room temperature (23° C.) rebound values which is predictive of a tire's rolling resistance when using a tired of the respective rubber composition. Here, higher values are considered to be better. Exps B–D demonstrated rebound values higher than the Control A which is considered herein to be significant because rolling resistance should be improved.

Also of significance is the comparative Tan. delta values which are considered to be comparatively indicative of wet traction. Exps B–D demonstrate equal to higher Tan. delta values at 0°C. and, thus, are predictive of equal to greater wet traction than the Control A.

These properties, as a whole, suggest dramatic improvements in treadwear (reduced treadwear) and slight to moderate improvements in rolling resistance (reduced resistance to rolling of the tire) and wet traction (greater traction from the tire tread to the wet road).

While certain representative embodiments and details have been shown for the purpose of illustrating the invention, it will be apparent to those skilled in this art that various changes and modification may be made therein without departing from the spirit or scope of the invention.

What is claimed is:

1. A pneumatic tire having a tread of a rubber composition characterized by being comprised of, based on 100 parts by weight rubber, a combination of a minor amount of elastomers having a high Tg in a range of about −30° C. to about +10° C. and a major amount of elastomers having a low Tg in a range of about −85° C. to about −110° C. and exclusive of elastomers having a Tg between −30° C. and −85° C.;

(A) elastomers consisting of about 20 to 50 phr of at least one synthetic elastomer having a Tg in a range of −30° C. to about +10° C. selected from the group consisting of
   (1) isoprene/butadiene copolymer containing about 10 to about 90 percent units derived from isoprene;
   (2) 3,4-polyisoprene having a 3,4-microstructure content of at least 60 percent; and
   (3) emulsion polymerization prepared styrene/butadiene copolymer having from about 45 to about 65 percent units derived from styrene and a vinyl 1,2-content based on the butadiene component thereof in a range of about 8 to about 15 percent; and/or solution polymerization prepared styrene/butadiene copolymer having from about 15 to about 40 percent units derived from styrene and a vinyl 1,2-content based on the butadiene component thereof in a range of 15 to 60 percent; and (B) elastomers consisting of from at least 50 to about 80 phr of at least one synthetic elastomer having a Tg in a range of −85° C. to about −110° selected from the group consisting of
   (1) isoprene/butadiene copolymer having about 10 to about 30 percent units derived from isoprene; and
   (2) cis 1,4-polybutadiene rubber having about 90 to about 98 percent cis 1,4-microstructure, and a vinyl 1,2-content in a range of about 2 to about 10 percent with the remainder being primarily of a trans 1,4-microstructure; and (C) about 40 to about 100 phr of particulate reinforcing filler selected from
   (1) carbon black or
   (2) carbon black and silica with a weight ratio of carbon black to silica in a range of about 1/20 to about 20/1; and (D) at least one silica coupler for the silica, if silica is used, having a moiety reactive with the surface of said silica and another, sulfur based, moiety interactive with said elastomer.

2. The tire of claim 1 wherein, for said tread, the elastomers for said rubber composition consist essentially of (A) about 30 to about 40 phr of at least one of said synthetic elastomers having a Tg in a range of −30° C. to about +10° C., and (B) about 60 to about 70 phr of at least one of said synthetic elastomers having a Tg in a range of −85° C. to about −110° C.

3. The tire of claim 1 wherein, for said tread, said particulate reinforcing agent consists essentially of carbon black and is exclusive of said silica coupler.

4. The tire of claim 2 wherein, for said tread, said particulate reinforcing agent consists essentially of carbon black and is exclusive of said silica coupler.

5. The tire of claim 1 wherein, for said tread, said reinforcing agent consists of carbon black and precipitated silica.

6. The tire of claim 2 wherein, for said tread, said reinforcing agent consists of carbon black and precipitated silica.

7. The tire of claim 5 wherein, for said tread, said silica coupler has a silane moiety reactive with silanol groups on the surface of said silica and another moiety interactive with the elastomers.

8. The tire of claim 5 wherein, for said tread, said coupler is a bis(trialkoxysilylalkyl)polysulfide having an average of from about 2 to about 5 sulfur in its polysulfidic bridge.

9. The tire of claim 6 wherein, for said tread, said coupler is a bis(trialkoxysilylalkyl)polysulfide having an average of from about 2 to about 5 sulfur in its polysulfidic bridge.

10. The tire of claim 7 wherein, for said tread, said coupler is a bis(trialkoxysilylalkyl)polysulfide having an average of from about 2 to about 5 sulfur in its polysulfidic bridge.

11. The tire of claim 5 wherein, for said tread, said coupler is a bis(triethoxysilylpropyl)polysulfide.

* * * * *